United States Patent
Taillaert et al.

(10) Patent No.: US 8,948,553 B2
(45) Date of Patent: Feb. 3, 2015

(54) DEEP-SHALLOW OPTICAL RADIATION FILTERS

(75) Inventors: Dirk Taillaert, Bredene (BE); Joost Brouckaert, Kortrijk (BE)

(73) Assignee: Huawei Technologies Co., Ltd., Shenzhen (CN)

( * ) Notice: Subject to any disclaimer, the term of this patent is extended or adjusted under 35 U.S.C. 154(b) by 186 days.

(21) Appl. No.: 13/550,333

(22) Filed: Jul. 16, 2012

(65) Prior Publication Data

US 2013/0022312 A1  Jan. 24, 2013

Related U.S. Application Data

(60) Provisional application No. 61/510,045, filed on Jul. 20, 2011.

(30) Foreign Application Priority Data

Jul. 19, 2011  (EP) ..................................... 11174448

(51) Int. Cl.
| | |
|---|---|
| *G02B 6/26* | (2006.01) |
| *G02B 6/12* | (2006.01) |
| *G02B 6/136* | (2006.01) |
| *G02B 6/10* | (2006.01) |
| *G02B 6/28* | (2006.01) |

(52) U.S. Cl.
CPC ............ *G02B 6/12007* (2013.01); *G02B 6/136* (2013.01); *G02B 6/2821* (2013.01); *G02B 2006/12147* (2013.01)
USPC ........................................... 385/30; 385/129

(58) Field of Classification Search
CPC .. G02B 6/136; G02B 6/2821; G02B 6/29332; G02B 6/29335; G02B 6/29338; G02B 6/29341; G02B 6/12004; G02B 6/12007; G02B 6/10; G02B 6/13; G02B 6/122
USPC ........................................................... 385/30
See application file for complete search history.

(56) References Cited

U.S. PATENT DOCUMENTS

| | | | |
|---|---|---|---|
| 4,938,841 A | 7/1990 | Shahar et al. | |
| 6,690,863 B2 * | 2/2004 | Deliwala | 385/50 |
| 7,174,080 B2 * | 2/2007 | Walker | 385/131 |
| 7,266,258 B2 * | 9/2007 | Liu et al. | 385/8 |
| 7,519,257 B2 * | 4/2009 | Lipson et al. | 385/126 |

(Continued)

OTHER PUBLICATIONS

European Search Report, European Patent Application No. 11174448 dated Jan. 23, 2012.
Bogaerts, Wim et al., "Silicon-on-Insulator Spectral Filters Fabricated With CMOS Technology", IEEE Journal of Selected Topics in Quantum Electronics, vol. 16, No. 1, Jan./Feb. 2010, pp. 33-44.

(Continued)

*Primary Examiner* — Rhonda Peace
(74) *Attorney, Agent, or Firm* — Leydig, Voit & Mayer, Ltd.

(57) ABSTRACT

An optical coupler for processing radiation is described. The optical coupler comprises a first deep-shallow waveguide and a second deep-shallow waveguide for guiding radiation in a propagation direction. Each of the deep-shallow waveguides is a waveguide comprising a shallow etched portion and an unetched portion having a width substantially constant along the propagation direction. The width of the shallow etched portion is substantially larger than the width of the unetched portion. The shallow etched portion of the first deep-shallow waveguide and the shallow etched portion of the second deep-shallow waveguide are arranged sufficiently close for coupling radiation from the first deep-shallow waveguide to the second deep-shallow waveguide.

14 Claims, 9 Drawing Sheets

(56) References Cited

U.S. PATENT DOCUMENTS

| | | | |
|---|---|---|---|
| 8,131,122 B2* | 3/2012 | Wang et al. ............... | 385/14 |
| 8,179,935 B2* | 5/2012 | Santori et al. ............. | 372/34 |
| 8,515,225 B2* | 8/2013 | Nakada et al. ............. | 385/39 |
| 2002/0191885 A1* | 12/2002 | Wu et al. ................... | 385/13 |
| 2003/0003737 A1* | 1/2003 | Delwala .................... | 438/689 |
| 2004/0131310 A1* | 7/2004 | Walker ...................... | 385/29 |
| 2005/0152658 A1 | 7/2005 | Keyser | |
| 2006/0215949 A1* | 9/2006 | Lipson et al. .............. | 385/2 |
| 2006/0228074 A1* | 10/2006 | Lipson et al. .............. | 385/42 |
| 2007/0230858 A1* | 10/2007 | Salib et al. ................ | 385/11 |
| 2007/0280616 A1 | 12/2007 | Patel et al. | |
| 2009/0245296 A1* | 10/2009 | Santori et al. ............. | 372/20 |
| 2010/0021171 A1 | 1/2010 | Wang et al. | |
| 2012/0243828 A1* | 9/2012 | Suzuki ...................... | 385/32 |
| 2013/0022312 A1* | 1/2013 | Taillaert et al. ........... | 385/30 |

OTHER PUBLICATIONS

Dai, Daoxin et al., "Bilevel Mode Converter Between a Silicon Nanowire Waveguide and a Larger Waveguide", Journal of Lightwave Technology, vol. 24, No. 6, Jun. 2006, pp. 2428-2433.

Barkai, Assia et al., "Double-Stage Taper for Coupling Between SOI Waveguides and Single Mode Fiber", Journal of Lightwave Technology, vol. 26, No. 24, Dec. 15, 2008, pp. 3860-3865.

Solehmainen, K. et al., "Development of Multi-Step Processing in Silicon-on-Insulator for Optical Waveguide Applications", Journal of Optics A: Pure and Applied Optics, vol. 8, 2006, pp. S455-S460.

Webster, M.A. et al., "Width Dependence of Inherent TM-Mode Lateral Leakage Loss in Silicon-on-Insulator Ridge Waveguides", IEEE Photonics Technology Letters, vol. 19, No. 6, Mar. 15, 2007, pp. 429-431.

* cited by examiner

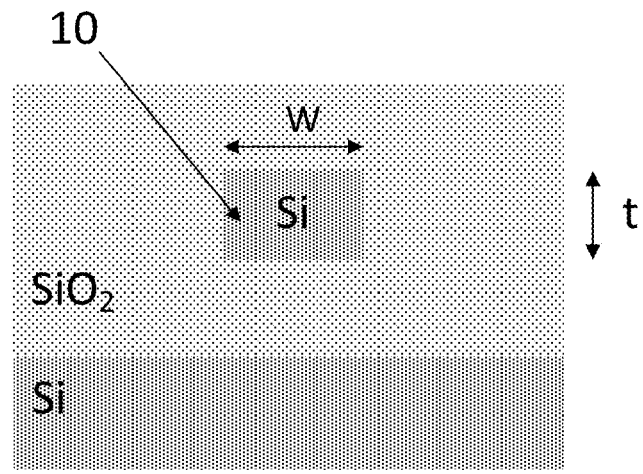
FIG. 1a – Prior art
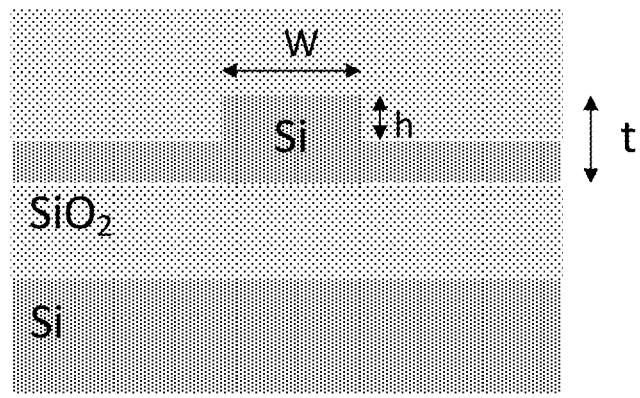
FIG. 1b – Prior art (a)

(b)

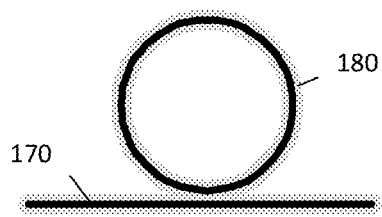
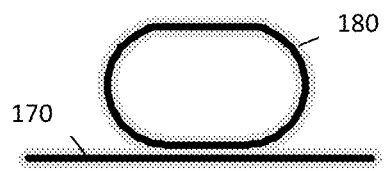
FIG. 6a  FIG. 6b
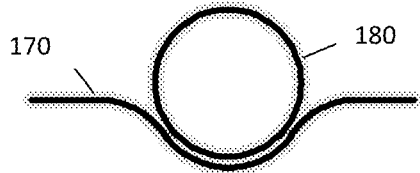
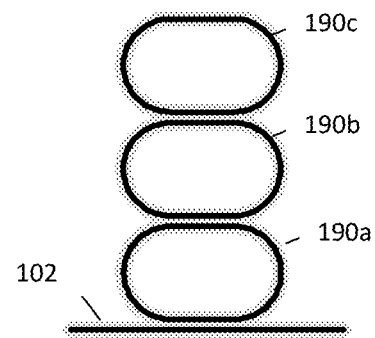
FIG. 6c  FIG. 6d
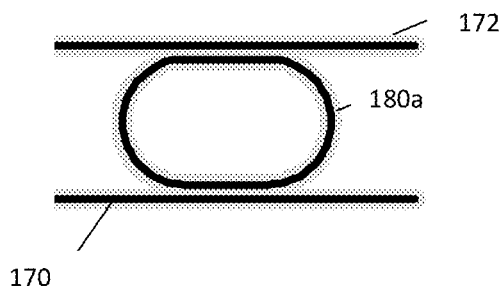
FIG. 6e

DEEP-SHALLOW OPTICAL RADIATION FILTERS

CROSS REFERENCE TO RELATED APPLICATIONS

Pursuant to the provisions of 35 U.S.C. §119(b), this application claims priority to EP11174448.8 filed Jul. 19, 2011, the entire contents of which are incorporated herein by reference. The present patent application also claims priority under 35 U.S.C. §119(e) to U.S. Provisional Patent Application Ser. No. 61/510,045, which was filed Jul. 20, 2011, the entire contents of which are incorporated herein by reference.

FIELD

The present invention relates to the field of photonics. More particularly, the present invention relates to methods and systems for filtering or splitting radiation.

BACKGROUND

Optical devices such as photonic sensors, optically controlled switches, and wavelength converters often use waveguides for guiding and supporting the radiation signal. An advantageous technology that can be used for fabricating waveguide structures with different functionality is semiconductor-on-insulator (SOI) technology. A silicon optical waveguide consists of a silicon core (with high refractive index) and a cladding material with a lower refractive index. This cladding material is typically oxide, air, or polymer. These waveguides are fabricated on SOI (silicon-on-insulator) wafers using lithography, etching, and deposition process steps.

Optical waveguide complexes can be configured in such way that they allow filtering, splitting, modulating, or manipulating the incoming signal. One example of an integrated optical device is a directional coupler, which is used to transfer radiation from one waveguide to another waveguide. The directional coupler basically consists of two waveguides with the same width placed sufficiently close to each other so that optical power can be interchanged between the waveguides and incoming radiation, launched into a first waveguide, can couple into a second waveguide upon propagation through the directional coupler. A directional coupler can be designed to function as a simple splitter (e.g. 50/50 splitter or 10/90 splitter), but a directional coupler can also be used as a wavelength filter (e.g., splitting 1310 nm wavelength and 1490 nm wavelength) or as a polarization splitter (splitting Transverse Electric (TE) and Transverse Magnetic (TM) modes). Depending on specific design parameters such as the length over which the waveguides are in close proximity, the directional coupler can thus be used as a splitter, a wavelength filter or as a polarization filter.

The directional coupler thus can be a versatile building block for photonic integrated circuits, but its performance depends strongly on the width of the waveguides and the width of the gap in between both waveguides.

Efficient coupling between adjacent waveguide channels also plays an important role in optical ring resonators, which are optical devices comprising a waveguide in a closed loop (for instance a ring or a racetrack) coupled to one or more input/output waveguides. When radiation of an appropriate wavelength is coupled from the input waveguide into the loop, it builds up in intensity due to constructive interference over multiple circuits around the ring resonator. Ring resonators are wavelength selective devices that may be used for various filter and modulation applications.

Currently two different types of dielectric index-guided waveguides are used. Deep (etched) wave guides, also known as strip or wire waveguides, and shallow (etched) waveguides, also known as rib or ridge waveguides. The disadvantage of the shallow waveguide is that it has a high leakage loss for TM polarization, so it can only have low loss for TE polarization.

In most cases, wire waveguides are used to guide radiation from the input to the output of the coupled waveguide system. An example of such a deep etched waveguide or strip or wire waveguide is shown in FIG. 1a (cross section). The width w of the core 10 of the strip waveguide is typically in the order of 450 nm and the thickness t is typically in the order of about 220 nm. A disadvantage of the deep etched waveguide is that it is very sensitive to the dimensions, in particular to the linewidth of the waveguide. Furthermore, the performance of a coupling system based on deep waveguides also depends strongly on the widths of the waveguides and on the distance between the waveguides (gap width). Sidewall surface roughness of the wire waveguides can induce huge propagation losses and forms an obstruction to realize high-efficient optical coupling devices.

Rib waveguides, being less sensitive to surface roughness, can be used as well in radiation coupling devices, but have to deal with high propagation losses of guided TM modes due to coupling to leaky TE modes. An example of a shallow etched waveguide or rib or ridge waveguide is shown in FIG. 1b. In this example, the width W (unetched portion) is typically in the order of 650 nm, the thickness t is typically in the order of 220 nm and the height h (difference in thickness between the unetched portion and the shallow etched portion) is typically in the order of 50 nm. As indicated in I.E.E.E. Photonics Technology Letters, Vol. 19, March-April 2007, pages 429-431, "Width dependence of inherent TM-mode lateral leakage loss in silicon-on-insulator ridge waveguides", by M. A. Webster, rib waveguides formed in silicon-on-insulator can be designed to have a reduced loss for TM-modes by carefully choosing the width of the waveguide.

Although tuning of the width W of the waveguide may solve the problem of making a shallow waveguide that guides a TM mode with low loss, this solution typically may not be suitable for all optical waveguide devices. For example in filters, the waveguide widths need to be adapted to the filter characteristic. The waveguide width that is needed for the particular filter property will in general not be the same as the waveguide width that is needed to have low TM losses.

SUMMARY

Waveguide structures providing efficient filtering and corresponding filtering methods are described.

It is an advantage of embodiments according to the present invention that efficient filtering systems and methods can be obtained, whereby both TM losses can be small as well as the requirements on waveguide specifications can be low.

It is an advantage of embodiments according to the present invention that the deep-shallow structures according to embodiments of the present invention can be used as directional coupler.

It is an advantage of embodiments according to the present invention that the deep-shallow structures can be used as a wavelength filter.

It is an advantage of embodiments according to the present invention that the deep-shallow structures can be used as a polarization splitter, i.e., for splitting TE and TM modes.

It is an advantage of embodiments according to the present invention that the deep-shallow structures can be used as radiation splitters, e.g., inducing intensity splitting such as for example a 50/50 percentage intensity splitter or a 10/90 percentage intensity splitter.

It is an advantage of embodiments according to the present invention that the deep-shallow structures can be used in a cascaded filter. An example of such a cascaded filter may for example be a structure consisting of a deep-waveguide structure as directional coupler, a Mach-Zehnder interferometer and again a deep-waveguide structure as directional coupler.

It is an advantage of embodiments according to the present invention that the couplers can also be used in combination with longer deep-shallow waveguides, e.g., for inducing a delay line for example in a Mach-Zehnder interferometer.

It is an advantage of embodiments according to the present invention that the deep-shallow transition structures can be easily combined with straight waveguides, e.g., in semiconductor on insulator applications.

It is an advantage of embodiments according to the present invention that the deep-shallow waveguide filtering systems can be used for ring resonators as well as with more conventional waveguides.

The above objective is accomplished by a method and device according to the present invention.

The present invention relates to an optical coupler for processing radiation, the optical coupler comprising a first deep-shallow waveguide and a second deep-shallow waveguide for guiding radiation in a propagation direction, each of the deep-shallow waveguides being waveguides comprising a waveguide core with an unetched portion, a shallow etched portion at both lateral sides of the unetched portion, and a deep etched portion next to the shallow etched portions, the shallow etched portions and the unetched portion having a width substantially constant along the propagation direction, the width of the shallow etched portion being substantially larger than the width of the unetched portion, whereby the unetched portion of the first deep-shallow waveguide and the unetched portion of the second deep-shallow waveguide are arranged sufficiently close for coupling radiation from the first deep-shallow waveguide to the second deep-shallow waveguide.

The first deep-shallow waveguide and the second deep-shallow waveguide may be arranged to couple over a predetermined length for inducing a filtering effect on incoming radiation so that a first radiation sub-beam of the incoming radiation is being substantially present at one output port of the coupler and a second radiation sub-beam of the incoming radiation is being substantially present at another output port of the coupler.

The first deep-shallow waveguide and the second deep-shallow waveguide may be arranged to couple over a predetermined length so that the first radiation sub-beam substantially is radiation having a first optical characteristic and the second radiation sub-beam substantially is radiation having a second optical characteristic, different from the first optical characteristic.

The first deep-shallow waveguide and the second deep-shallow waveguide may be arranged to couple over a predetermined length so that the first radiation sub-beam substantially is radiation at a first wavelength or in a first wavelength range and the second radiation sub-beam substantially is radiation at a second wavelength or a second wavelength range, different from the first wavelength or first wavelength range.

The first wavelength may be, for example, 1310 nm and the second wavelength may be, for example, 1490 nm. It is an advantage of embodiments according to the present invention that wavelength filtration can be obtained suitable in fibre to the home applications, using an integrated optical coupler.

The first deep-shallow waveguide and the second deep-shallow waveguide may be arranged to couple over a predetermined length so that the first radiation sub-beam substantially is radiation having a first polarization state and the second radiation sub-beam is radiation having a second polarization state different from the first polarization state. It is an advantage of embodiments according to the present invention that a polarization splitter is obtained that is less critical to particular dimensional characteristics of the device while allowing splitting TE and TM polarization without substantial loss in any of the polarization states.

The shallow etched portion of the first deep-shallow waveguide and the shallow etched portion of the second deep-shallow waveguide may be in direct contact with each other. The predetermined length may correspond with a coupling length for a radiation mode present in the first radiation sub-beam and not in the second radiation sub-beam.

The first deep-shallow waveguide may be a ring, racetrack, or disc shaped deep-shallow waveguide.

The optical coupler may be a resonator device.

The second deep-shallow waveguide may be a bent waveguide following at least part of the curvature of the first deep-shallow waveguide.

The first deep-shallow waveguide and the second deep-shallow waveguide may be arranged for allowing evanescent coupling between the first deep-shallow waveguide and the second deep-shallow waveguide.

The present invention also relates to an optical device for processing radiation, the optical device comprising an optical coupler as described above.

The optical device furthermore may comprise at least one deep-shallow transition structure for coupling a deep waveguide to the optical coupler, the deep-shallow transition structure comprising an unetched portion and a shallow etched portion whereby the ratio of the widths of the unetched portion and the shallow etched portion of the deep-shallow transition structure varies along the propagation direction of the radiation.

The optical device may comprise at least two deep output waveguides for separately guiding radiation sub-beams having different properties away from the optical coupler.

The present invention also relates to use of an optical coupler or optical device for filtering radiation in radiation of a first type from radiation of a second type, the second type being different from the first type.

The present invention also relates to methods for filtering, the method comprising splitting or filtering radiation by transmitting the radiation through a first deep-shallow waveguide and a second deep-shallow waveguide for guiding radiation in a propagation direction, each of the deep-shallow waveguides being waveguides comprising a shallow etched portion and an unetched portion having a width substantially constant along the propagation direction, the width of the shallow etched portion being substantially larger than the width of the unetched portion, whereby the unetched portion of the first deep-shallow waveguide and the unetched portion of the second deep-shallow waveguide are arranged sufficiently close for coupling radiation from the first deep-shallow waveguide to the second deep-shallow waveguide. Further method features corresponding with the functionality of the optional components described above also may be part of the optical coupler or the optical device.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

BRIEF DESCRIPTION OF THE DRAWINGS

FIG. 1a and FIG. 1b illustrate an example (cross-sectional view) of a deep etched waveguide respectively a shallow etched waveguide, as known from prior art.

FIG. 6a to FIG. 6e show alternative embodiments of an optical radiation coupler with at least one ring-shaped deep-shallow waveguide.

DETAILED DESCRIPTION OF ILLUSTRATIVE EMBODIMENTS

Figure 2:
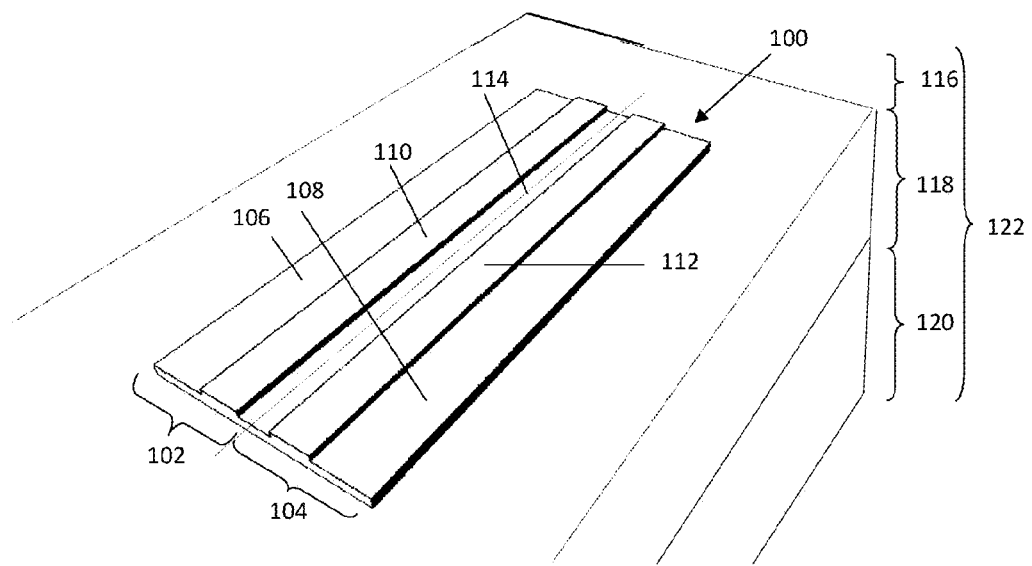
FIG. 2 shows a 3D view of an optical radiation coupler according to a first embodiment of the present invention.

In the following detailed description, specific details are set forth in order to provide a thorough understanding of the invention and how it may be practiced in particular embodiments. However, it will be understood that the present invention may be practiced without these specific details. In other instances, well-known methods, procedures and techniques have not been described in detail, so as not to obscure the present invention. While the present invention will be described with respect to particular embodiments and with reference to certain drawings, the reference is not limited hereto. The drawings included and described herein are schematic and are not limiting the scope of the invention. It is also noted that in the drawings, the size of some elements may be exaggerated and, therefore, not drawn to scale for illustrative purposes.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

It is to be understood that the terms used in embodiments of the invention described herein are capable of operation in other orientations than described or illustrated herein.

It is to be understood that the term "comprising" should not be interpreted as being restricted to the steps or elements listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising A and B" should not be limited to devices consisting only of components A and B.

In the context of this invention, the term "radiation" is used for indicating electromagnetic radiation with a wavelength in a suitable range, i.e., electromagnetic radiation with a wavelength that is not absorbed by the materials used (e.g., the waveguide material), for example electromagnetic radiation with a wavelength between 1 µm and 2 µm, e.g., near infrared radiation (NIR) or short wavelength infrared radiation (SWIR), although embodiments of the present invention are not limited thereto.

Where in embodiments according to the present invention reference is made to filtering systems or devices, reference is made to an action whereby radiation of a first type is separated from radiation of at least a second type.

The devices and methods of the present invention are further described for the particular case of an SOI (Silicon-on-Insulator) material system. However, the devices and methods of the present invention can be based on other material systems, such as for example III-V material systems, semiconductor-on-insulator material systems, metallic layers, low index contrast material systems such as glass or silica-based systems, or a combination thereof. Where reference is made to low refractive index materials, reference may be made to material systems wherein the difference in refractive index, e.g., between a cladding material and a core material, is limited to less than 1, e.g., to one or a few tenths of a refractive index unit.

Silicon-on-Insulator is a very interesting material system for highly integrated photonic circuits. The high refractive index contrast allows photonic waveguides and waveguide components with submicron dimensions to guide, bend, and control light on a very small scale so that various functions can be integrated on a chip. Moreover SOI offers a flexible platform for integration with other optical components and opto-electronic components. Using Silicon-on-insulator also has some technological advantages. Due to the CMOS industry, silicon technology has reached a level of maturity that outperforms any other plane chip manufacturing technique by several orders of magnitude in terms of performance, reproducibility, and throughput. Embodiments of the present invention are particularly useful when considering submicron semiconductor-on-insulator technology, also referred to as thin semiconductor-on-insulator technology, although embodiments are not limited thereto.

Where in embodiments according to the present invention reference is made to a shallow etched portion of a waveguide, reference is made to a waveguide portion wherein the TM and TE mode do not undergo substantially strong intensity reduction. In embodiments according to the present invention the shallow etched portion of a waveguide is a portion of the waveguide wherein the etch depth of the waveguide core is in the range of 5% to 50% of the thickness of the unetched portion of the waveguide core. In other words, in the shallow etched portion the remaining thickness of the waveguide core is in the range between 50% and 95% of the thickness of the unetched portion of the waveguide core.

Where in embodiments according to the present invention reference is made to an unetched portion of a waveguide, reference is made to a waveguide portion wherein substantial losses occur for the TM mode upon propagation, but wherein the sensitivity for dimensional changes is relatively low.

Where in embodiments according to the present invention reference is made to a deep etched portion of a waveguide, reference is made to a waveguide portion wherein the etch depth of the waveguide core is in the range between 80% and 100% of the thickness of the unetched portion of the waveguide core. In other words, in the deep etched portion the remaining thickness of the waveguide core is in the range between 20% and 0% of the unetched portion of the waveguide core.

Figure 13:
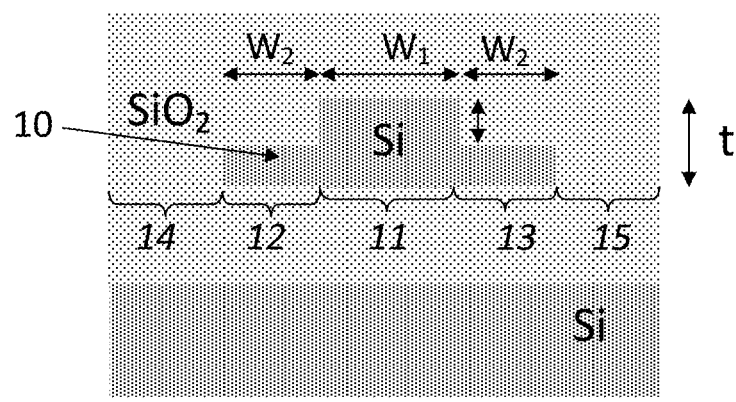
FIG. 13 shows a cross-sectional view of a deep-shallow waveguide as used in embodiments of the present invention The same reference numerals are used for indicating the same components in different drawings.

When in embodiments according to the present invention reference is made to a deep-shallow waveguide, reference is made to a waveguide comprising an unetched portion, a shallow etched portion at both lateral sides of the unetched portion, and a deep etched portion next to the shallow etched portions as illustrated in the cross-sectional view of FIG. 13 for a silicon-on-insulator material system. The width $W_1$ of the unetched portion 11 of the core 10 can for example be in the range between 450 nm and 850 nm.

The shallow etched portion comprises a first shallow etched portion 12 at one lateral side of the unetched portion 11 and a second shallow etched portion 13 at an opposite lateral side of the unetched portion 11. The width of the shallow etched portions 12, 13 can for example be in the range between 200 nm and 2000 nm. In the example of FIG. 13 both shallow etched portions are shown with a same width $W_2$, but the present invention is not limited thereto. The width of the first shallow etched portion 12 can be different from the width of the second shallow etched portion 13.

The deep-shallow waveguide further comprises a first deep etched portion 14 next to the first shallow etched portion 12 and a second deep etched portion 15 next to the second shallow etched portion 13. The unetched portion 11 and the shallow etched portions 12, 13 of a deep-shallow-waveguide in accordance with the present invention have a width substantially constant along the propagation direction. The width of the shallow etched portion may typically be substantially larger than the width of the unetched portion.

In a first aspect, the present invention relates to an optical coupler for processing radiation. Processing radiation may for example be filtering radiation or splitting a radiation beam. Filtering or splitting radiation may for example be performed with respect to the polarization state of the radiation, with respect to the wavelength or with respect to the intensity.

The optical coupler according to embodiments of the present invention typically comprises at least one a first deep-shallow waveguide and a second deep-shallow waveguide for guiding radiation in a propagation direction. A shallow etched portion of the first deep-shallow waveguide and a shallow etched portion of the second deep-shallow waveguide thereby are arranged sufficiently close for coupling radiation from the first deep-shallow waveguide to the second deep-shallow waveguide. The first deep-shallow waveguide and the second deep-shallow waveguide then may be referred to as coupled waveguides. The coupling may for example be evanescent wave coupling.

Figure 3:
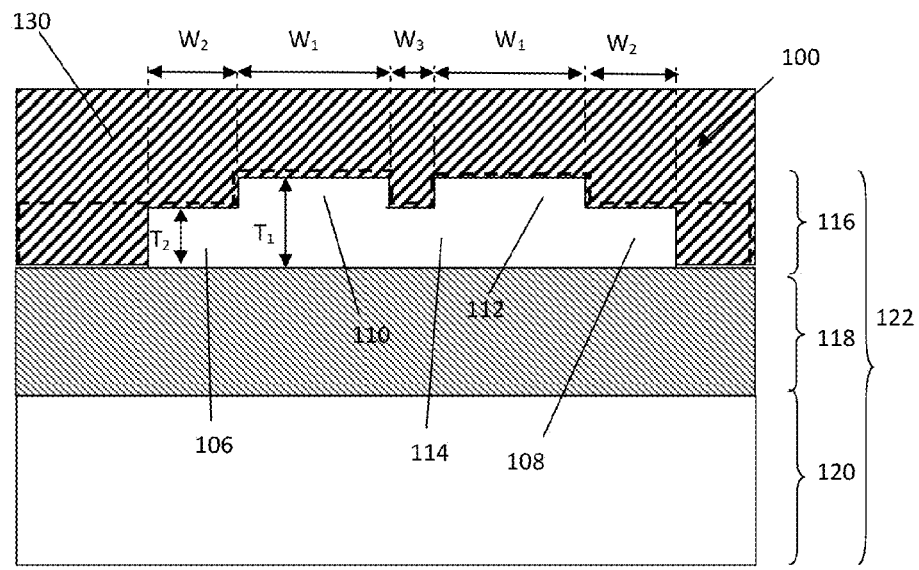
FIG. 3 shows a cross-sectional view of a deep-shallow waveguide structure of an optical radiation coupler according to the present invention.

By way of illustration, embodiments of the present invention not being limited thereto, further features and advantages will be described using an exemplary radiation coupler as shown in FIG. 2 and FIG. 3. FIG. 2 illustrates an optical radiation coupler 100 according to a first embodiment of the present invention, composed of two deep-shallow waveguides 102, 104, which may for example be formed from a silicon layer 116 (waveguide core layer) of a silicon-on-insulator (SOI) structure, the SOI structure 122 furthermore comprising a buried oxide layer 118 (lower waveguide cladding layer) and a silicon handling wafer 120.

The two deep-shallow waveguides 102, 104 each have an unetched region 110, 112, a shallow etched region 106, 108 at one side of the unetched region 110, 112, and a shallow etched contact region 114 shared with the other deep-shallow waveguide 104, 102 at an opposite side of the unetched region 110, 112. A waveguide cladding layer 130 (upper waveguide cladding layer), shown in FIG. 3, is disposed onto the silicon-on-insulator structure 122. The upper cladding layer 130 may be any suitable layer that allows confining radiation to the deep-shallow waveguides 102, 104 of the optical radiation coupler 100. This cladding layer may for example be an oxide layer, air, or a polymer layer.

FIG. 3 illustrates an example of a cross-section of an optical radiation coupler 100 according to embodiments of the present invention. In the optical radiation coupler 100, the deep-shallow waveguides 102, 104 share at least one contact region 114, being a shallow etched region. The optical coupler of the present example is fabricated from a silicon-on-insulator (SOI) structure 122, consisting of a silicon handling wafer 120, a buried oxide layer 118 (lower cladding layer), and a silicon layer 116 (core layer) formed over the buried oxide layer 118.

The fabrication process of the optical radiation coupler of the filter structure may be as follows. First, the silicon layer 116 is etched to form a radiation guide layer consisting of two rib waveguides structures having an unetched portion and a shallow etched portion. After the first etching step, the radiation guide layer 116 is further deeply etched to form two deep-shallow waveguides 102, 104, each having an unetched region 110, 112 with a first thickness $T_1$ and a width $W_1$, a shallow etched region 106, 108 with a second thickness $T_2$ and a second width $W_2$ at one side of the unetched region 110, 112, and a contact region 114 (shallow etched region) at an opposite side of the unetched region 110, 112, having the same thickness $T_2$ as the shallow etched regions 106, 108 and a gap width $W_3$ between the unetched regions 110, 112.

In Table 1, typical values and tolerated ranges of the dimensions of an optical radiation coupler 100 according to the present invention are depicted. In the case of ring resonators, the diameter is assumed to be at least 5 μm.

TABLE 1

| | Typical dimension (nm) | Tolerated range (nm) |
|---|---|---|
| T1 | 220 | 150-400 |
| W1 | 700 | 450-850 |
| T1-T2 | 70 | 0.05*T1-0.5*T1 |
| W2 | 1000 | 200-2000 |
| W3 | 350 | 200-500 |

Although in the examples described here, it is assumed that the width of the unetched portion 110 of the first deep-shallow waveguide 102 is substantially equal to the width of the unetched portion 112 of the second deep-shallow waveguide 104, the present invention is not limited thereto, and in embodiments of the present invention, both deep-shallow waveguides can have a different width of the unetched portion. Although in the examples described here, it is assumed that the width of the shallow etched portion 106 at one side of the first deep-shallow waveguide 102 is substantially equal to the width of the shallow etched portion 108 at one side of the second deep-shallow waveguide 104, the present invention is not limited thereto, and in embodiments of the present invention, both deep-shallow waveguides can have a different width of the shallow etched portion.

It is an advantage of an optical radiation coupler 100 according to embodiments of the present invention that by providing deep-shallow waveguides 102, 104, TM radiation modes can be guided with limited loss, thus rendering the radiation coupler less polarization dependent. It is an advantage of embodiments of the present invention that losses for a TM mode can be limited while at the same time a good tolerance on the core widths and the gap width of the optical radiation coupler is obtained. Typical tolerances that may be obtained using the method according to the present invention can be up to about ±20 nm.

The length of the deep-shallow optical coupler may be designed by simulations. The eigenmode expansion and propagation method is suitable for calculating this kind of structures. The final optimization may be done experimentally by fabricating a lot of structures with slightly different lengths and measuring the optical performance to select the optimal length. The deep-shallow optical coupler may be made in a plurality of configurations. In one embodiment, the deep-shallow optical coupler is made of at least two substantially straight waveguides, as illustrated above in FIG. 2 and FIG. 3.

According to embodiments of the present invention, the two deep-shallow waveguides may be configured such that they are arranged sufficiently close for coupling radiation from the first deep-shallow waveguide 102 to the second deep-shallow waveguide 104, thus forming coupled waveguides. In some embodiments, the configuration may be such that there is a contact region 114 between the two deep-shallow waveguides. In that case the modes of the two waveguides will partially overlap, allowing that evanescent wave coupling occurs between the two deep-shallow waveguides.

In the embodiment shown, the contact region 114 extends over the entire length of the propagation waveguides in the optical coupler. According to particular embodiments of the present invention, the waveguides forming the optical coupler, i.e., being part thereof, can be straight or can be bend. In such embodiments, only part of the deep-shallow waveguides may be in contact with each other.

Figure 4:
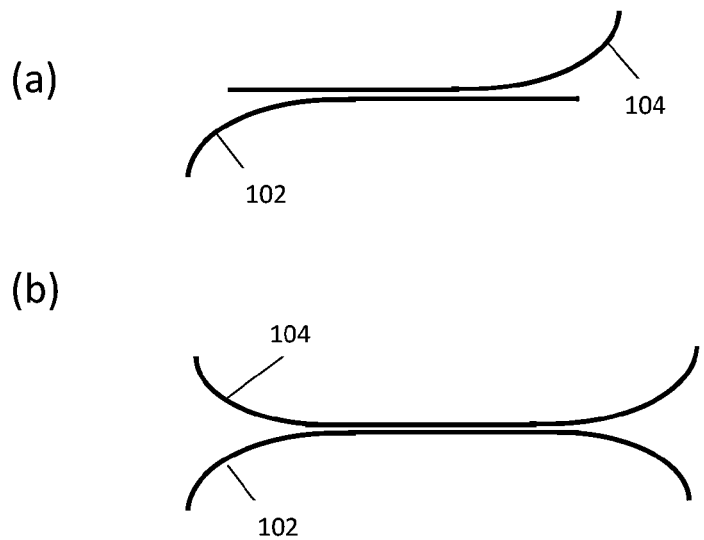
FIG. 4 shows alternative embodiments of an optical radiation coupler according to the present invention, wherein the deep-shallow waveguides are bended.

For example, as schematically illustrated in FIG. 4, at least one of the deep-shallow waveguides 102, 104 may be partially bended, so that only the straight parts of the deep-shallow waveguides 102, 104 are in close contact with each other. FIG. 4a illustrates two deep-shallow waveguides 102, 104 each being curved on one side, whereas FIG. 4b illustrates two deep-shallow waveguides 102, 104 being curved on both sides.

Figure 5:
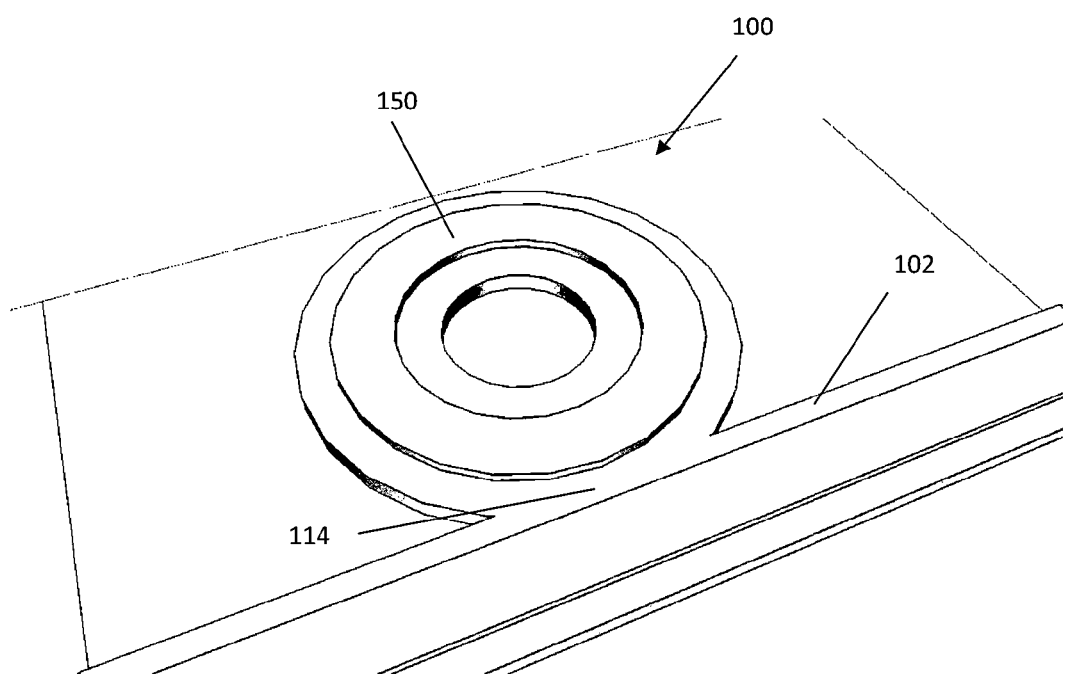
FIG. 5 shows a 3D view of an optical radiation coupler according to an embodiment of the present invention, wherein the optical radiation coupler comprises a ring-shaped deep-shallow waveguide.

In yet another embodiment of an optical radiation coupler 100 according to the present invention, the optical radiation coupler 100 may comprise at least one ring-shaped deep-shallow waveguide. This is illustrated in FIG. 5, where the optical radiation coupler 100 is composed of a ring-shaped deep-shallow waveguide 150 and another deep-shallow waveguide 102, e.g., a straight waveguide 102. In a closed resonator deep-shallow waveguide, e.g., a racetrack deep-shallow waveguide or ring deep-shallow waveguide, the important parameters are the propagation loss in the closed resonator and the coupling towards the other deep-shallow waveguide. In some examples, the input and output may be performed with respect to the other deep-shallow waveguide, thus functioning as an input/output bus waveguide, although embodiments of the present invention are not limited thereto.

The coupling section in a closed resonator is similar to the coupling section of the optical coupler as described above, but typically the coupling coefficient is substantially lower when a closed resonator is involved, as the interface region 114 is shorter. A typical power coupling coefficient in a closed resonator coupling section is around 1%, whereas in a directional coupler with non-bend waveguides it can be up to 100%.

Many different shapes of closed resonators exist, the optimal shape depending on the coupling coefficient that is needed for the application in which the closed resonator is used. A plurality of examples of different configurations is shown in FIG. 6a to FIG. 6e, showing a first deep-shallow waveguide 170 and one or more second deep-shallow waveguides 180, 190a, 190b, 190c. In the first two examples a closed resonator 180 and a single non-bend waveguide 107 form the optical coupler, i.e., FIG. 6a illustrates the structure with a ring waveguide and FIG. 6b illustrates the example with a racetrack shaped waveguide. In FIG. 6c, a coupler is illustrated whereby the bus waveguide follows part of the curvature of the closed resonator, the bus waveguide thus also being a bend waveguide. In FIG. 6d, cascaded ring resonators 190a, 190b, 190c are used in the coupler. Finally in FIG. 6e, the use of more than one straight waveguide 170, 172 as bus waveguides is illustrated.

Embodiments of the present invention may be used for filtering or splitting radiation. The particular function may be tuned by tuning the actual design. In one set of embodiments, the optical coupler is a radiation filter structure, whereby incoming radiation is filtered depending on its wavelength and/or depending on its polarization state. Filtering radiation depending on its wavelength can be obtained by designing the coupler in such a way that radiation from input 1 will end up in output 1 for one wavelength and in output 2 for another wavelength. Filtering radiation depending on its polarization state can be obtained by designing the coupler in such a way that radiation from input 1 will end up in output 1 for one polarization and in output 2 for the other polarization.

In one embodiment, the optical coupler is adapted for operating as an intensity splitter. The latter may allow to accurately split radiation beams into two or more subbeams with predetermined intensity. Examples of splitters that can be made are 50/50 intensity splitters or 90/10 intensity splitters, the present invention not being limited thereto.

The filtering and/or splitting can for example be obtained by designing the coupler to have a predetermined length, corresponding with the coupling length required for coupling all radiation of one type of radiation from a first waveguide to a second waveguide, while not corresponding with the coupling length for the second type of radiation. This will result in the radiation of one type being switched to the other waveguide completely after travelling this predetermined length, while the radiation of the second type may be only partially switched to the other waveguide or may already have switched back partially or fully to the original waveguide of input. In other words, selecting of the length of the coupler results in selection of the filtering properties for radiation.

According to embodiments of the present invention, the optical coupler is built up from deep-shallow waveguides obtained by superposing two etch steps, resulting in an optical coupler comprising an unetched portion and a shallow-etched portion superimposed on each other. The unetched portion and the shallow etched portion are superposed and have substantially constant width along the propagation direction. The waveguides can be straight or bend.

In the example shown, the optical coupler is illustrated as implemented in silicon on insulator, but embodiments according to the present invention are not limited thereto. By way of example, it can also be implemented in silicon nitride or indium phosphide. The optical coupler can be implemented in any suitable high-index contrast waveguide system.

By way of illustration, embodiments of the present invention not being limited thereto, an example of a filter is further discussed below, illustrating features and advantages of embodiments according to the present invention. In the example shown, illustrated in FIG. 7, a deep-shallow filtering structure is shown for splitting optical radiation into a first output radiation beam having a TM mode at a wavelength of 1310 nm and a second output radiation beam having a TE mode at a wavelength of 1490 nm. Design of the radiation coupler was performed using a mode solver whereby the propagation constants of the modes of the two coupled waveguides were calculated and based thereon also the coupling length of the coupler was calculated.

Figure 7:
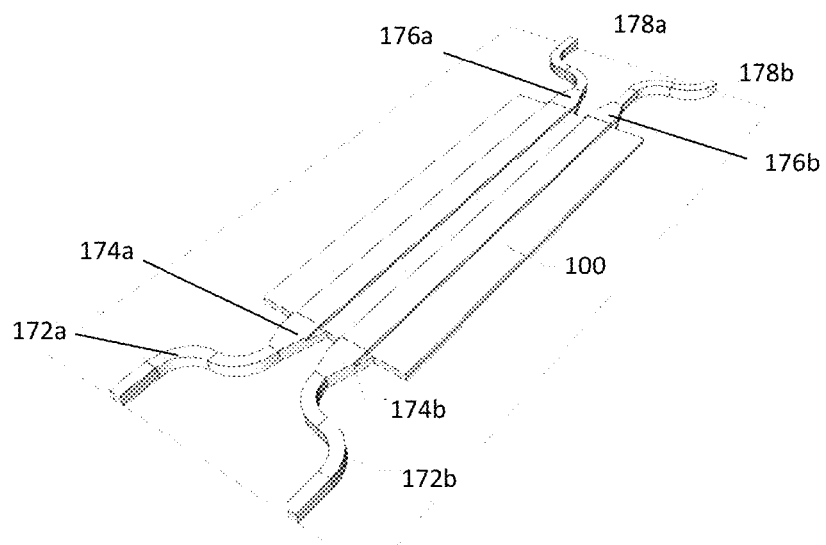
FIG. 7 illustrates a deep-shallow waveguide based filtering structure, according to an embodiment of the present invention.

The deep-shallow filtering structure therefore comprises a deep-shallow directional coupler, i.e., a directional coupler having an unetched portion and a shallow etched portion, according to embodiments of the present invention. The radiation may be coupled from input waveguides and towards output waveguides, using transition structures. In the present example, the transition structures also are deep-shallow transition structures. In operation, both TE and TM modes at wavelengths of 1310 nm and 1490 nm are coupled in via an input coupling waveguide or a number of input coupling waveguides, each of the input coupling waveguides comprising the different types of radiation. By passing through the optical coupler, the radiation is filtered through the deep-shallow filtering structure, and radiation filtered both in wavelength and in polarization is transmitted in separated output waveguides. In other words, in one output radiation waveguide in the present example the 1310 nm TM mode is coupled out and in one output radiation waveguide the 1490 nm TE mode is coupled out. FIG. 7 illustrates two deep input waveguides 172a, 172b, a set of deep-shallow transition structures 174a, 174b, an optical coupler 100, deep-shallow transition structures 176a, 176b for outcoupling and two output waveguides 178a, 178b for outcoupling the filtered radiation.

In a further aspect, the present invention relates to an optical device comprising a filtering structure according to the first aspect of the present invention. Such an optical device may comprise, besides an integrated filtering structure as described above, further components, advantageously integrated such that a fully integrated optical device is obtained.

The integration may be a full integration such that the structure is integrally made, a monolithic integration, or a heterogeneous integration. The other components may for example be radiation couplers, radiation sources, waveguides, further splitters or filters, detectors, or any other optical component allowing guiding, coupling, generating, modifying, or processing radiation. Such an optical device may be used for any optical or electro-optical application, such as for example for optical access (fiber to the home) applications, datacom, telecom, in sensing devices or in readout devices for optical fiber sensors.

Figure 8:
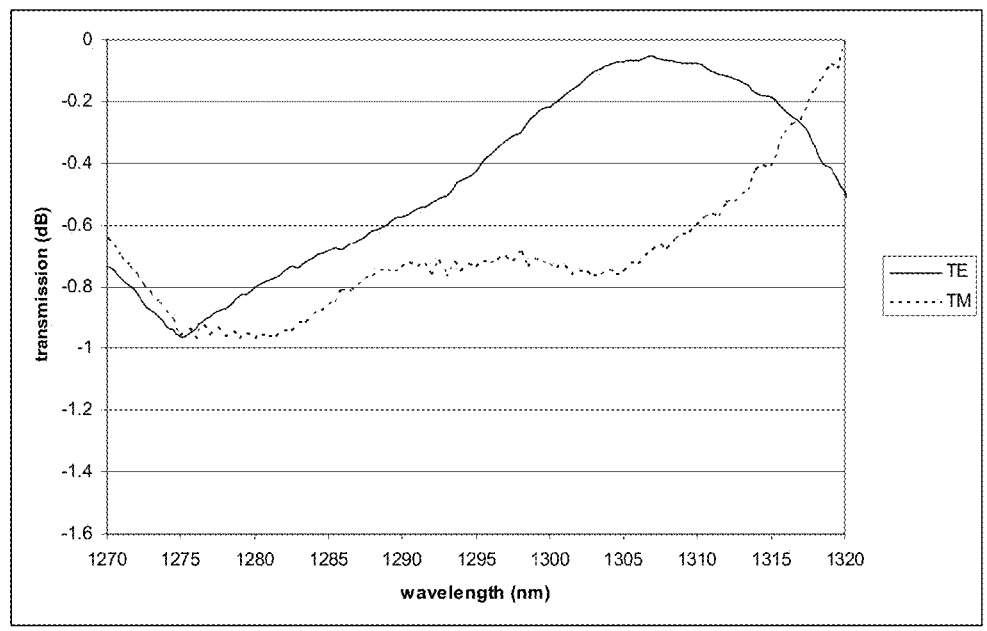
FIG. 8 illustrates low losses for TE and TM polarization modes in a deep-shallow waveguide structure, as advantageously used in embodiments according to the present invention.

Embodiments of the present invention on the one hand make use of the low losses that are present in deep-shallow waveguides for both TM and TE modes, and on the other hand make use of the flexibility of the design of deep-shallow waveguides for obtaining appropriate filtering properties. An example of the low losses for TE and TM polarization modes in a deep-shallow waveguide structure is shown by way of illustration in FIG. 8, whereby it can be seen that the losses for both polarizations is comparable. Both the transmission for the TE mode (solid line) and for the TM mode (dashed line) are illustrated.

In a shallow etched waveguide, the propagation losses of the guided TM mode can be large due to leakage to leaky TE modes. In the shallow etched region, the remaining silicon is still thick enough to support TE slab modes. Moreover, the effective index of the guided TM mode is lower than the effective index of some TE modes in the etched region.

Because there are a very large number of those leaky TE modes, the effective index of one of them will be very close to the effective index of the guided TM mode. As a result, the guided TM mode can couple to one or more TE modes, even in a straight waveguide, and this results in large propagation loss. This is avoided by using in the optical coupler deep-shallow waveguide structures in accordance with the present invention.

Figure 9A:
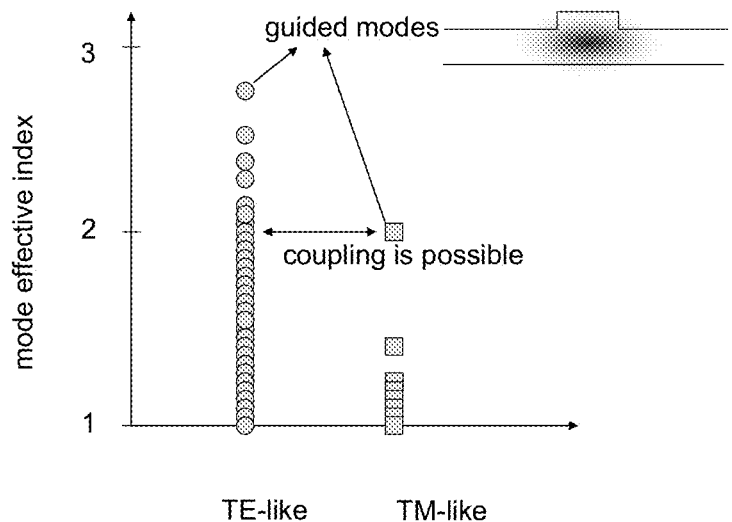
FIG. 9a and FIG. 9b illustrate the principle of leakage for the shallow etched waveguide (FIG. 9a) and of non-leakage for the deep-shallow waveguide (FIG. 9b), indicating advantages that can be used in embodiments according to the present invention.
Figure 9B:
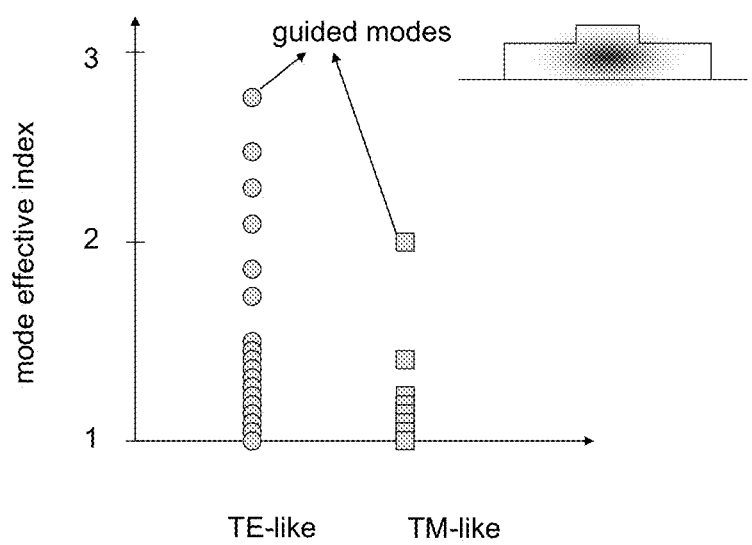

The properties of the guided TE and TM mode in these shallow-deep waveguides are very similar to the shallow waveguide, but the loss of the guided TM mode is avoided. The reason is that the number of leaky TE-modes is drastically reduced. As a result, the effective index of the leaky TE modes is different from the guided TM mode and there is no coupling between the guided TM mode and leaky TE modes. Optimum waveguide widths can easily be selected and avoidance of some bad combinations of widths for the shallow and deep portion can be done by trial and error, through simulation using a mode solver. In FIG. 9a and FIG. 9b, the principle of leakage for the shallow etched waveguide (FIG. 9a) and of non-leakage for the deep-shallow waveguide (FIG. 9b) is illustrated. The advantages of deep-shallow waveguides are used in the present invention.

As illustrated above (e.g., in the example of FIG. 7), in some embodiments according to the present invention, the optical device furthermore comprises deep-shallow transition structures for coupling to the deep-shallow coupler. Such deep-shallow transition structures may, for example, be used for converting the mode from a deep etched waveguide to a deep-shallow etched waveguide or from a deep-shallow etched waveguide to a shallow etched waveguide. Such a transition structure is also manufactured by applying a deep etch and a shallow etch. The structure nevertheless differs from the deep-shallow coupler or deep-shallow waveguide itself by the fact that the ratio of the width of the deep portion and the shallow portion changes along the length of the structure.

One example of such a deep-shallow transition structure is a structure wherein the shallow etched portion or the unetched portion has a tapered shape, whereas the other portion has a constant width. The transition structure is based on the physical principle that it forms an adiabatic transition. It is adapted for converting the mode of the deep waveguide to the mode of the shallow waveguide.

Figure 10:
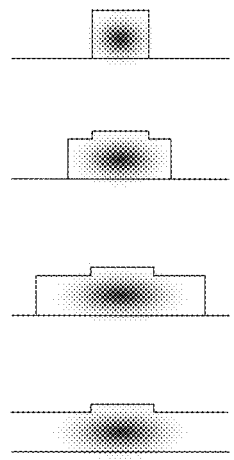
FIG. 10 illustrates the mode transition in a deep-shallow waveguide, illustrating features that can be used in embodiments according to the present invention.

By way of illustration, embodiments of the present invention not being limited thereto, the transition of a mode in a transition structure is shown in FIG. 10, indicating the expansion of an optical mode in the transition structure. In a photonic integrated circuit, other devices or waveguides may be implemented in a deep waveguide only. The transition structure can thus, for example, be used for connecting a deep waveguide to the deep-shallow directional coupler by using transitions or tapers where the width of the shallow etched and/or unetched region varies. The length of these transition structures is typically a few micrometers.

By way of illustration, embodiments of the present invention not being limited thereto, characteristics of the directional coupler filter as described above with reference to FIG. 3 are discussed below.

For the simulation, the following parameters are used. The thickness T1 used was 220 nm, the etch depth ($T_1$-$T_2$) used was 70 nm, the width $W_1$ of the waveguide was 700 nm and the gap width $W_3$ was 400 nm. The length of the device was 102 micrometer.

The structure is designed in such a way that the coupling length for the 1310TM mode is twice the coupling length of the 1490TE mode. As a result, the directional coupler can split 1310TM and 1490TE if the length of the directional coupler equals the coupling length for 1310™. When 1310TM light is launched at an input waveguide, it is completely coupled to the other waveguide at the end of the coupler. Consequently, all radiation in this mode is at one output port (the output port of the other waveguide), and no radiation is at the output port of the waveguide corresponding with the input port.

Figure 11A:
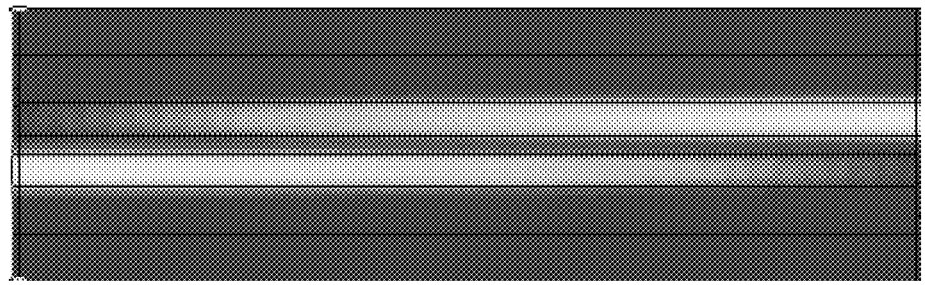
FIG. 11a and FIG. 11b illustrate the field plot for a 1310 TM mode and a 1490 TE mode in an optical coupler as shown in FIG. 3, illustrating the filtering effect obtained using an embodiment of the present invention.
Figure 11B:
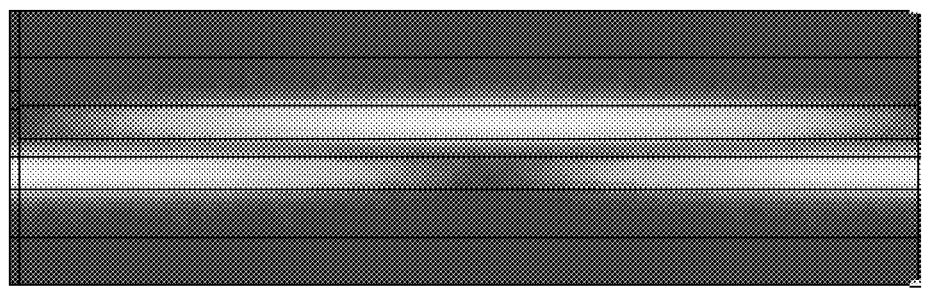

When 1490TE light is launched at an input waveguide, it is also coupled to the other waveguide, but the coupling length is different. At the output end of the coupler, all the 1490TE radiation will be back in the input waveguide. The latter is illustrated in FIG. 11a and FIG. 11b illustrating the fieldplot for the 1310TM mode and for the 1490TE mode respectively.

Figure 12A:
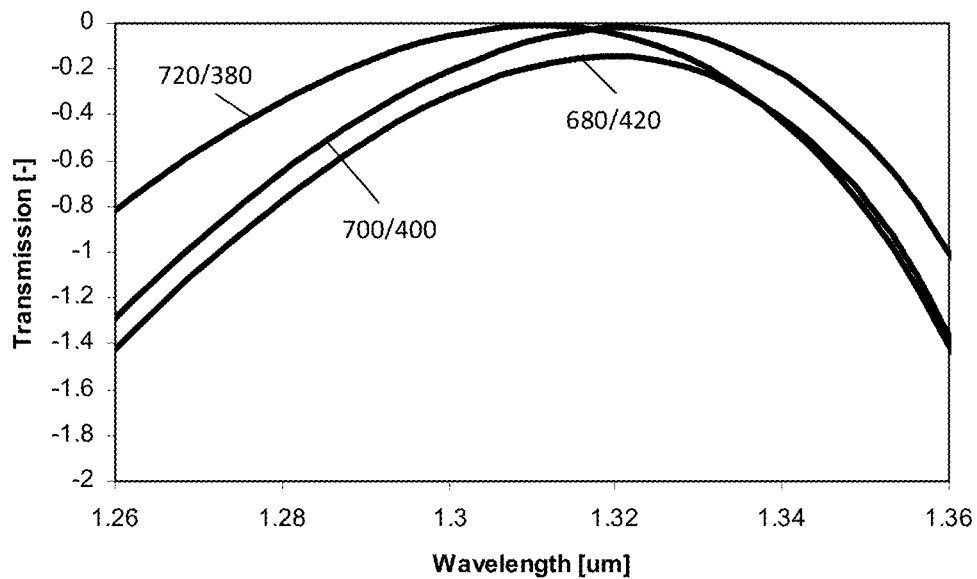
FIG. 12a and FIG. 12b illustrate the wavelength dependence of the 1310 TM output port respectively the 1490 TE output port (transmission in dB) whereby the tolerances to fabrication errors are illustrated by providing results for different width/gap parameters, illustrating advantages of embodiments according to the present invention.
Figure 12B:
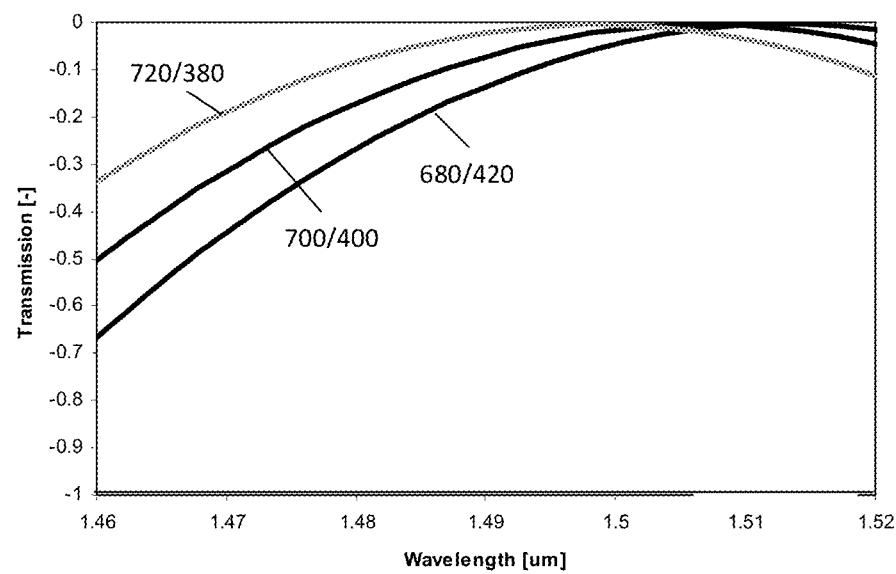

In FIG. 12a and FIG. 12b, the wavelength dependence for the output channels at 1310 nm TM respectively 1490 nm TE are shown, whereby the transmission is expressed in dB. To illustrate the tolerances to fabrication errors (e.g., errors on the waveguide and gap widths), curves are shown for different width and gap parameters. It was found that an error of 20 nm results in less than 10 nm wavelength shift. If a similar device would be implemented in a deep waveguide only, it can be calculated that the wavelength shift would be larger for a 20 nm error. If a similar device would be implemented in a shallow waveguide, there would be additional loss for the TM polarized light.

The invention claimed is:

1. An optical coupler for processing radiation, the optical coupler comprising:
    a first deep-shallow waveguide, and
    a second deep-shallow waveguide for guiding radiation in a propagation direction,
    wherein each of the first and second deep-shallow waveguides comprises:
        an unetched portion,
        a first shallow etched portion at a first side of the unetched portion,
        a second shallow etched portion at a second side of the unetched portion, and
        a deep etched portion next to the second shallow etched portion,
    wherein the unetched portion and the first and second shallow etched portions each have a width substantially constant along the propagation direction,
    wherein the first shallow etched portion of the first deep-shallow waveguide and the first shallow etched portion of the second deep-shallow waveguide are in direct contact with one another,
    wherein the width of the first and second shallow etched portions of the first and second deep-shallow waveguides are substantially larger than the width of the unetched portion of the first and second deep-shallow waveguides, respectively, and
    wherein the unetched portion of the first deep-shallow waveguide and the unetched portion of the second deep-shallow waveguide are arranged sufficiently close for coupling radiation from the first deep-shallow waveguide to the second deep-shallow waveguide.

2. The optical coupler according to claim 1, wherein the first deep-shallow waveguide and the second deep-shallow waveguide are arranged to couple over a predetermined length for inducing a filtering effect on incoming radiation so that a first radiation sub-beam of the incoming radiation is being substantially present at one output port of the coupler and a second radiation sub-beam of the incoming radiation is being substantially present at another output port of the coupler.

3. The optical coupler according to claim 2, wherein the first deep-shallow waveguide and the second deep-shallow waveguide are arranged to couple over the predetermined length so that the first radiation sub-beam substantially is radiation having a first optical characteristic and the second radiation sub-beam substantially is radiation having a second optical characteristic, different from the first optical characteristic.

4. The optical coupler according to claim 3, wherein the first deep-shallow waveguide and the second deep-shallow waveguide are arranged to couple over the predetermined length so that the first radiation sub-beam substantially is radiation at a first wavelength or in a first wavelength range and the second radiation sub-beam substantially is radiation at a second wavelength or a second wavelength range, different from the first wavelength of first wavelength range.

5. The optical coupler according to claim 4, wherein the first wavelength is 1310 nm and wherein the second wavelength is 1490 nm.

6. The optical coupler according to claim 3, wherein the first deep-shallow waveguide and the second deep-shallow waveguide are arranged to couple over the predetermined length so that the first radiation sub-beam substantially is radiation having a first polarization state and the second radiation sub-beam is radiation having a second polarization state different from the first polarization state.

7. The optical coupler according to claim 2, wherein the predetermined length corresponds with a coupling length for a radiation mode present in the first radiation sub-beam and not in the second radiation sub-beam.

8. The optical coupler according to claim 1, wherein the first deep-shallow waveguide is a ring, racetrack or disc shaped deep-shallow waveguide.

9. The optical coupler according to claim 8, wherein the optical coupler is a resonator device.

10. The optical coupler according to claim 8, wherein the second deep-shallow waveguide is a bent waveguide following at least part of the curvature of the first deep-shallow waveguide.

11. The optical coupler according to claim 1, wherein the first deep-shallow waveguide and the second deep-shallow waveguide are arranged for allowing evanescent coupling between the first deep-shallow waveguide and the second deep-shallow waveguide.

12. An optical device for processing radiation, the optical device comprising:
- an optical coupler comprising:
  - a first deep-shallow waveguide, and
  - a second deep-shallow waveguide for guiding radiation in a propagation direction, wherein each of the first and second deep-shallow waveguides includes:
    - an unetched portion,
    - a first shallow etched portion at a first side of the unetched portion,
    - a second shallow etched portion at a second side of the unetched portion, and
    - a deep etched portion next to the second shallow etched portion, wherein the unetched portion and the first and second shallow etched portions have a width substantially constant along the propagation direction,
  - wherein the first shallow etched portion of the first deep-shallow waveguide and the first shallow etched portion of the second deep-shallow waveguide are in direct contact with one another,
  - wherein the width of the first and second shallow etched portions of the first and second deep-shallow waveguides are substantially larger than the width of the unetched portion of the first and second deep-shallow waveguides, respectively, and
  - wherein the unetched portion of the first deep-shallow waveguide and the unetched portion of the second deep-shallow waveguide are arranged sufficiently close for coupling radiation from the first deep-shallow waveguide to the second deep-shallow waveguide.

13. The optical device for processing radiation according to claim 12, the optical device further comprising at least one deep-shallow transition structure for coupling a deep waveguide to the optical coupler, the deep-shallow transition structure comprising an unetched portion and a shallow etched portion, wherein the ratio of the widths of the unetched portion and the shallow etched portion of the deep-shallow transition structure varies along the propagation direction of the radiation.

14. The optical device according to claim 12, the optical device comprising at least two deep output waveguides for separately guiding radiation sub-beams having different properties away from the optical coupler.

* * * * *